United States Patent [19]

Rutten

[11] 4,296,135
[45] Oct. 20, 1981

[54] METHOD OF FORMING A LAYER OF PRE-DETERMINED THICKNESS FROM A FEEDSTOCK OF BUTTER OR MARGARINE

[75] Inventor: Jacques P. Rutten, Tilburg, Netherlands

[73] Assignee: Machinefabriek C. Rijkaart B.V., Asperen, Netherlands

[21] Appl. No.: 45,999

[22] Filed: Jun. 6, 1979

[51] Int. Cl.³ .................... A21D 13/00; A23C 15/00
[52] U.S. Cl. .................................. 426/275; 426/664; 426/517; 426/663
[58] Field of Search ............... 426/274, 275, 663, 664, 426/94, 302, 303, 502, 517; 83/121, 122, 349, 356.3

[56] References Cited

U.S. PATENT DOCUMENTS 3,142,573 7/1964 Erekson et al. ................. 426/94
3,151,987 10/1964 Colby ............................ 426/274

OTHER PUBLICATIONS

Lord, Isabel Ely; *Everybody's Cookbook;* 1937; p. 325.

Matz, Samuel A.; *Cookie and Cracker Technology;* 1968, pp. 238 and 245.
Child, Julia et al.; *Mastering the Art of French Cooking,* vol. 2; 1974; p. 115.

Primary Examiner—Joseph M. Golian
Assistant Examiner—Elizabeth J. Curtin
Attorney, Agent, or Firm—Diller, Ramik & Wight

[57] ABSTRACT

A method and a device to form a layer of certain thickness of an emulsion-like substance, for example, butter or margarine from a feedstock of any shape, wherein an amount of substance is repeatedly scraped from the feedstock and subsequently a portion of the desired thickness is separated from the scraped-off amount, the resultant portions being then joined one behind the other to form the desired layer, whereby owing to the scraping treatment of the emulsion-like substance the structure thereof is broken up and further treatment of the substance is facilitated even at lower temperatures without a change of the desired properties of the substance.

7 Claims, 3 Drawing Figures

U.S. Patent
Oct. 20, 1981
4,296,135
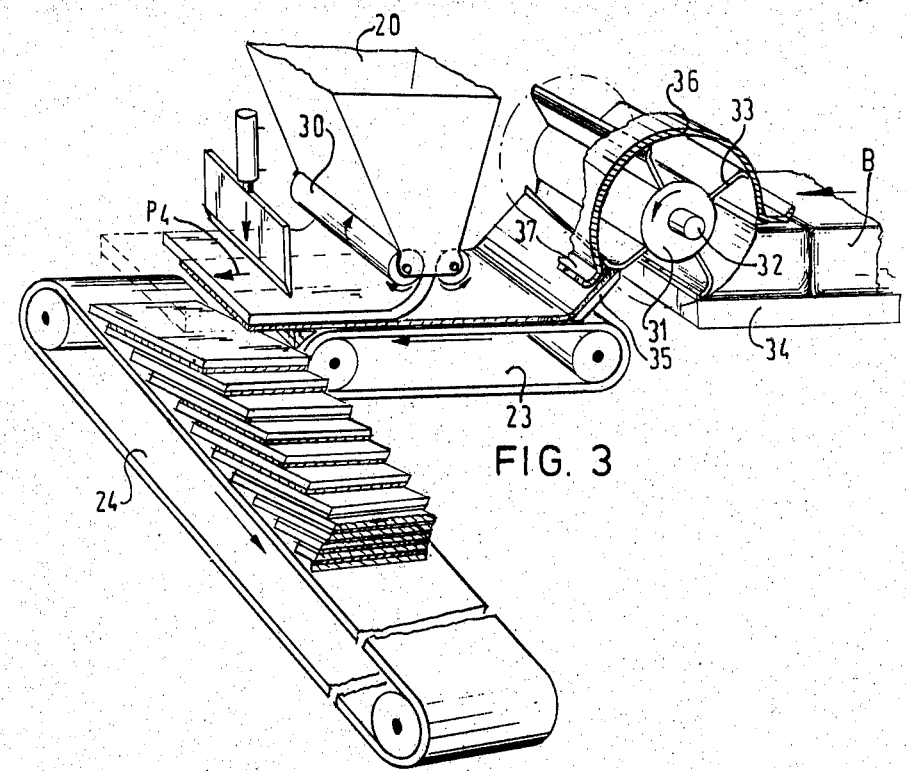
FIG. 3
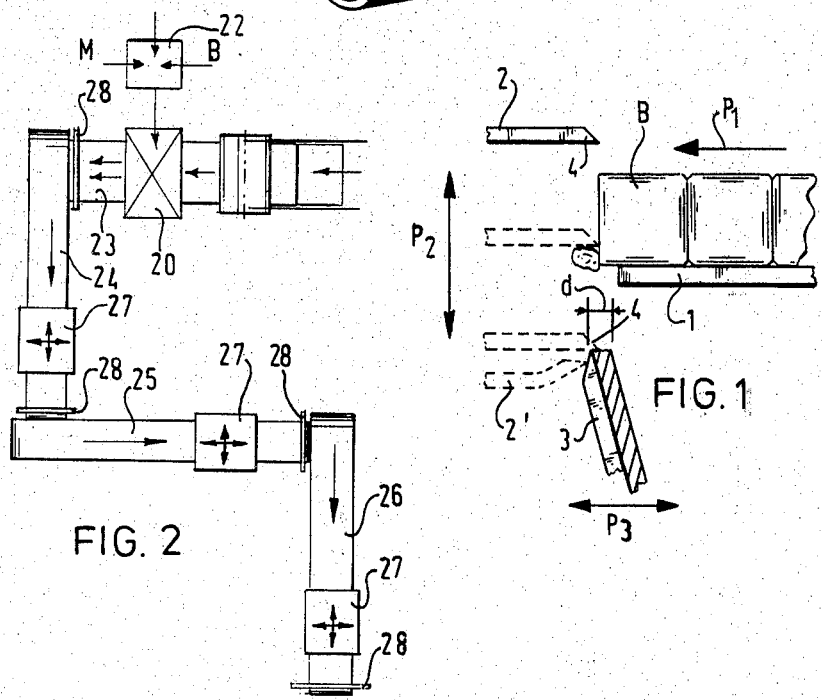
FIG. 2
FIG. 1

METHOD OF FORMING A LAYER OF PRE-DETERMINED THICKNESS FROM A FEEDSTOCK OF BUTTER OR MARGARINE

The invention relates to a method and a device to form a layer of desired thickness of an emulsion-like substance, for example butter or margarine from a feedstock of any shape.

In industrial processes it is sometimes desired to add an emulsion-like stubstance in the form of a layer to the process, for which purpose the substance has to be prepared so that the resultant layer can be readily worked up. However, emulsion-like substances bring about the problem that deformation of an amount of the substance, for example, by pressing extrusion and so on is performed only with difficulty, since the devices required to this end do not have sufficient grip on the substance or since the forces ensuring such a grip are considerably heavy. Severing layers of the substance from the feedstock is not a solution either, since the structure of the substance in the layer is not well appropriate for further processing.

The method according to the invention is distinguished in that an amount of substance is repeatedly scraped from the feedstock and subsequently a portion of the desired thickness is separated from the scraped-off amount, the resultant portions being then joined one behind the other to form the desired layer.

Owing to the scraped treatment of the emulsion-like substance the structure thereof is broken up and further treatment of the substance is facilitated even at lower temperatures without a change of the desired properties of the substance.

The device according to the invention is distinguished in that it comprises a feedstock container having an outlet port, a scraping member having at least one peripheral strip movable along a path past said outlet port and a wiper projecting into the path of the peripheral strip at a distance from said outlet port.

The scraping member is adapted to reciprocate but in a preferred embodiment the scraping member is constructed in the form of a plurality of blades rotatable about a shaft, each peripheral strip of which being substantially parallel to said shaft. In such a construction the substance can be worked continuously resulting in a high capacity.

In order to permit of varying the thickness of the layer to be formed it is advantageous to have the possibility of introducing the scraping member to a greater or lesser extent into the path of the or each peripheral strip by means of an adjustability of the scraping member at right angles to the direction of movement of the peripheral strips.

The device described above is particularly suitable for use in puff-paste producing systems. Such systems comprise a dough stock container and a belt conveyor system of any structure including rollers for the continuous application of layers or sheets of dough and subsequently laminating the same.

The device described above is arranged in accordance with the invention at the beginning of the group of band conveyors and a layer of butter is deposited on the first section of the band conveyor system, on which a layer of dough is subsequently deposited, the two layers being then further processed in common in accordance with the known principles of the cracker paste machines. In this manner cracker paste can be simply produced by the French method.

The invention will be explained more fully with reference to the following description of the figures. The drawing shows in FIG. 1 a first embodiment in a schematic representation of a device in accordance with the invention, FIG. 2 a schematic view of a cracker-paste producing system and FIG. 3 a perspective view of a detail of the system of FIG. 2 in which the device according to the invention is illustrated in a second embodiment.

The emulsion-like substance to be formed in accordance with the invention into a layer of a given thickness is represented in FIG. 1 in the form of a batch of rectangular shape B, three of which are shown on the holder 1 in FIG. 1. Pressing means (not shown) serve to push the batches B in the direction of the arrow P1 across the edge of the holder 1 so that a scraping member 2 can scrape an amount of the substance from the left-hand batch B, the substance accumulating on the bottom side of the scraping member 2. By driving means (not shown) the scraping member 2 can be moved up and down in the direction of the arrow P2 from a position indicated by solid lines in FIG. 1 via positions indicated by broken lines into a lowermost position 2'. Near this lowermost position 2' a wiping member 3 is disposed in a stationary manner and serves to sever a portion of the scraped-off amount from the scraping member 2 on the bottom side of the scraping blade. It will be obvious that the thickness of the wiped-off portion corresponds to the extent to which the wiping member protrudes into the path of the peripheral strip 4 of the scraping member 2. This extent is indicated by d in FIG. 1. The portions of the desired thickness D repeatedly wiped off will advance the previously wiped-off portions on the wiping member 3 so that the desired layer will be formed. Obviously the scraping effect of the member 2 changes the structure of the substance in the batch B as a result of the shear forces applied to the substance. Owing to the shear effect the original structure of the substances changes though not the properties so that even at very low temperatures the substance remains readily workable.

It should finally be noted that the extent d can be varied by inserting the wiping member 3 in the direction of the arrow P3, that is to say, at right angles to the direction of movement of the scraping member 2, to a greater or lesser extent into the path of movement of the peripheral strip 4.

FIG. 1 shows the scraping member 2 in the form of a flexible blade so that the peripheral strip can bend upwards when the scraping member 2 has reached the lowermost position 2'. It should be noted here that the redundant amount of substance not wiped off either remains in place or is conducted by means not shown back to the stock on the holder 1.

FIG. 2 shows schematically a cracker-paste producing system. The system mainly comprises a dough stock holder 20, which receives the dough from a mixing system 22, in which the ingredients flour M, water M and butter B are mixed. The resultant mixture in the stock holder 20 is conveyed on in layer-wise fashion on a band conveyor system 23 in the successive sections 24, 25 and 26 in a manner to be described more fully with reference to FIG. 3. Each section has its own lamination member 27 for laminating stacked layers of dough. At the end of each band conveyor section a cutting station 28 serves to sever a given sheet of dough from the strip of dough lying on each section. Such a system is considered to be known and lies outside the scope of the present invention. FIG. 3 shows part of the system of FIG. 2, that is to say, the part located at the transition from the band conveyor sections 23 to 24.

Above the conveyor section 23 is arranged the feeding through or stock holder 20 of the dough mixture concerned, on the bottom side of which two laminating rollers 30 deposit a layer of dough of a given thickness on the upper run of the conveyor band 23. This layer of dough is conducted away to the left in FIG. 3 in the direction of the arrow P4.

At the beginning of the band conveyor 23 the device embodying the invention is arranged for applying a layer of butter to the upper run of the conveyor band so that at the end of the conveyor band a strip of two layers i.e. a layer of butter and a superimposed layer of dough is obtained.

The application of the layer of butter is performed by means of a rotatable scraping member 31 consisting of scraping blades 33 rotatable about a shaft 32, which repeatedly sever an amount of butter from blocks of butter B supported on a holder 34.

Into the rotary path of the scraping blades 33 protrudes the wiping member 35 so that each time a portion of the amount of butter sticking to the scraping blades 33 is picked up in the manner described with reference to FIG. 1. Along the circumference of the path of the scraping blades 33 is arranged an arcuate screening plate 36, which is prolonged at the wiping member 35 by a guide plate 37, which is located at a distance from the carrying surface of the wiping member 35. This guide plate 37 serves to smooth the upper surface of the butter layer on the wiping member 35 and on the conveyor section 23 respectively.

In the embodiment shown in FIG. 3 the peripheral strips of the scraping blades 33 are in trailing positions relative to the direction of rotation, whilst the wiping member 35 is shaped so that a shearing movement is performed between the scraping blades 33 and the wiping member 35, which ensures an even run of the device.

After a given length of the dough-butter layer has passed by the cutting station 28 of FIG. 3, this length is cut off and reaches the conveyor section 24, the drive of which is such that the severed portions are deposited imbricately one upon the other. It will be obvious that in the next lamination operation again a single layer is obtained at the station 27 (see FIG. 2), which comprises alternately five layers of dough and butter in the embodiment shown.

In order to avoid soiling of the band conveyor in the section 24 by adhering butter residues it is advantageous to make the butter layer narrower than the dough layer which is illustrated on the left-hand top side of FIG. 3. The reduction in width of the butter layer depends upon the number of sheets to be stacked in the conveyor section 24.

What is claimed is:

1. A method of forming a layer of a desired thickness of a substance which is butter or margarine, from a feedstock of said substance of any shape characterized by repeatedly scraping off an amount from said feedstock and by subsequently severing a portion of the desired thickness from said amount, after which the portions are joined in order of succession to form the desired layer.

2. The method of simultaneously altering the structure of a stack of butter or margarine and forming a ribbon thereof which is of predetermined generally uniform thickness and of indefinite length, which comprises the steps of:
   (a) scraping successive layers from the stock to form discrete accumulations of the substance; and then
   (b) forming an advancing ribbon of the substance by depositing at least a portion of each successive accumulation onto a supporting surface while forcing each amount so-deposited against that previously deposited.

3. The method as defined in claim 2 including the step of advancing the stock in a given direction to provide feed for the scraping of step (a).

4. The method as defined in claim 2 including the step of depositing a layer of dough onto the advancing ribbon of step (b).

5. The method as defined in claim 4 including the step of advancing the stock in a given direction to provide feed for the scraping of step (a).

6. The method of simultaneously altering the structure of a stock of butter or margarine and forming a ribbon thereof which is of generally uniform thickness and of indefinite length, which comprises the steps of:
   (a) scraping material from the stock onto a scraping means to form a discrete accumulation of the material on the scraping means in which the structure of the material has been altered with respect to that of the stock;
   (b) wiping at least a portion of said accumulation off of said scraping means at an edge of a supporting surface to form a deposit of the material of altered structure at and along said edge; and
   (c) forming a lengthwise growing ribbon of altered material on the supporting surface by repeating steps (a) and (b) in sequence many times.

7. The method of simultaneously altering the structure of a stock of a butter or margarine and forming a ribbon thereof which is of generally uniform thickness and of indefinite length, which comprises the steps of:
   (a) scraping material from the stock onto a scraping means to form a discrete accumulation of the material on the scraping means in which the structure of the material has been altered with respect to that of the stock;
   (b) engaging the scraping means against an edge of a supporting surface to force at least a portion of said accumulation onto said supporting surface at and along said edge thereof and wiping off such portion from the scraping means by drawing the scraping means over said edge;
   (c) repeatedly repeating steps (a) and (b) in sequence and, during each repetition of step (b), forcing the portion of the accumulation against that portion previously forced onto and wiped off onto the supporting surface so as to form a lengthwise growing ribbon of the altered material on the supporting surface.

* * * * *